May 8, 1951  D. F. ANDERSON  2,552,132
TORQUE APPLYING MEANS FOR ROTATING GIMBAL TYPE GYROSCOPES
Filed Dec. 24, 1949
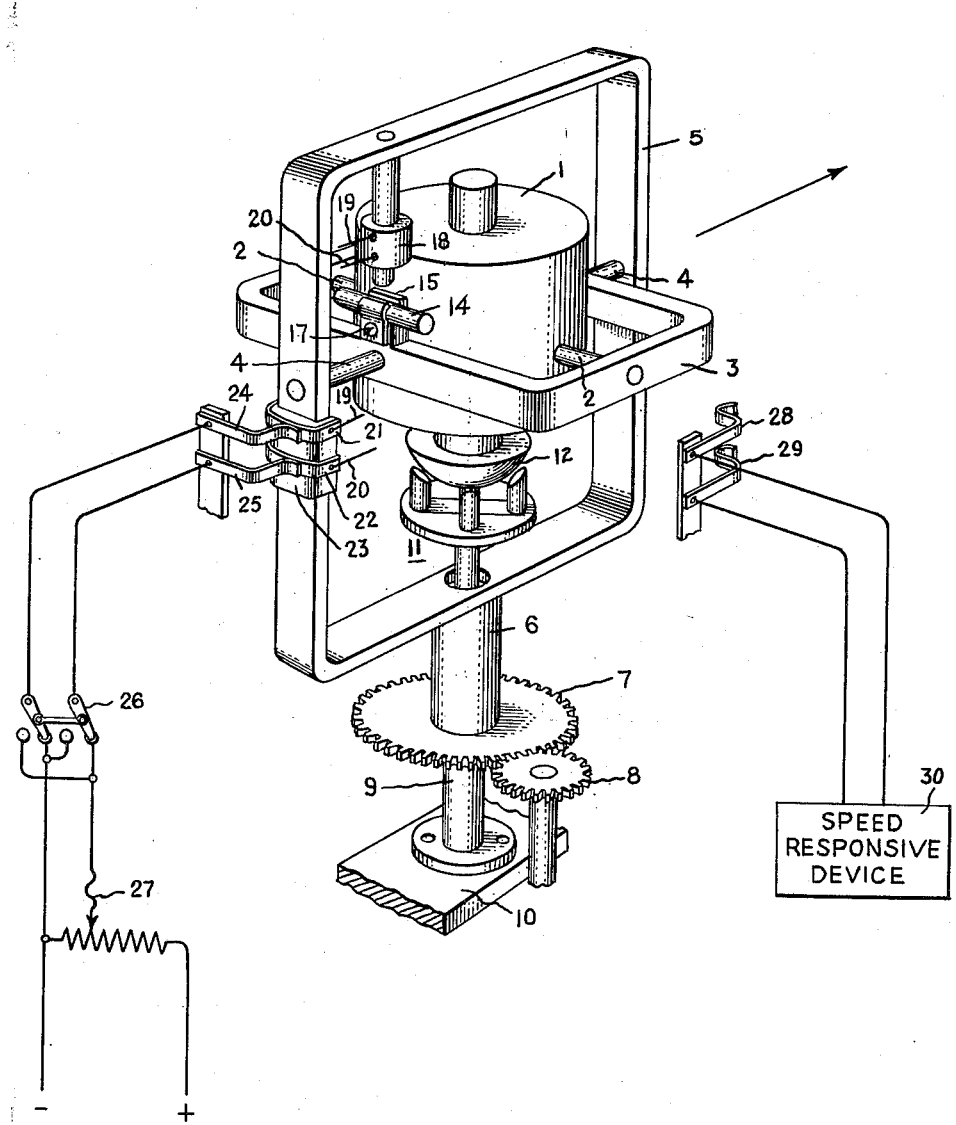
Inventor:
Duane F. Anderson,
by *Claude A. Mott*
His Attorney.

Patented May 8, 1951

2,552,132

UNITED STATES PATENT OFFICE 2,552,132

TORQUE APPLYING MEANS FOR ROTATING GIMBAL TYPE GYROSCOPES

Duane F. Anderson, Schenectady, N. Y., assignor to General Electric Company, a corporation of New York Application December 24, 1949, Serial No. 134,973

5 Claims. (Cl. 74—5.4)

This invention relates to gyroscopes and more particularly to means for applying corrective torques to gyroscopes operating with a rotating gimbal system and adapted to be mounted on high speed vehicles such as aircraft.

If a gyroscope is mounted in a high speed aircraft, and an attempt is made to erect the spin axis of the gyroscope to a vertical line, and to maintain the spin axis vertical, two factors tending to bias the spin axis from the vertical manifest themselves.

One of these, known as the acceleration of Coriolis, is represented by an acceleration which acts in a direction perpendicular to the course of the plane. Facing the direction in which the plane is heading, it acts to the right in the northern hemisphere and to the left in the southern hemisphere. As well as varying with the speed of the plane, it also varies as the sine of the latitude angle, being zero at the equator and a maximum at the poles. This acceleration does not affect the gyroscope directly, but rather the acceleration responsive erector or erection system.

The acceleration of Coriolis when added vectorially to the acceleration of gravity produces a resultant acceleration, the direction of which is not a true vertical. It is to this latter line that the erector tends to align the spin axis of the gyroscope. The net result of this acceleration is that the gyroscope spin axis will lean either to the right or to the left of the plane in which the aircraft is traveling depending on whether it is in the northern or the southern hemisphere. We may refer to this departure from the vertical as the angle of lean $\phi$. The characteristic of most acceleration responsive erecting systems is such that the erecting torque applied to the gyroscope is directly proportional to the angle that the gyroscope spin axis makes with the lines of the erector. In order to correct for the acceleration of Coriolis it is necessary to apply to the gyroscope a torque impulse (torque times time) opposite in direction but equal in magnitude to the torque impulse applied by the erector when the angle $\phi$ exists between the gyro spin axis and the line of the erector.

The other factor which tends to bias the spin axis arises from the angular velocity of the plane around the earth and, as is well understood, acts directly on the gyroscope, tending to maintain its spin axis fixed with respect to space rather than with respect to the earth.

Although the foregoing factors are responsible for producing errors in a vertical seeking gyro when being carried at high speeds, the magnitude and direction of these errors, for a given vehicle speed and latitude, can be determined by suitable computing means and therefore it remains only to provide suitable correcting means for eliminating such errors.

Gyroscopic devices in which the gimbal system is rotated are well-known. There are various reasons for rotating the gimbal system, the primary one being that the gyro will not be precessed by unbalance torques (i. e., mechanical unbalance of the gyro about its pivots, and of the gimbal about its pivots). Another reason is that some erecting systems depend upon the rotating gimbal for their erecting action.

It is therefore an object of my invention to provide simple and reliable means for precessing a gyroscope which operates with a rotating gimbal system.

It is a further object of my invention to provide electromagnetic means for eliminating errors due to the effects of Coriolis acceleration and of vehicle speed in gyroscopic devices having rotating gimbal systems.

Briefly, according to my invention, I provide a simple arrangement for exerting impulse torques at appropriate times on the gyro so that precession of the gyroscope will result in such directions as will correct the above-mentioned errors. In accordance with a preferred embodiment, the means for exerting a precessing torque comprises an elongated permanent magnet which is mounted horizontally on the gyro gimbal above the point where its trunnions are journaled into an outer gimbal. Suspended from the outer gimbal and just over the elongated magnet, there is mounted an electromagnet whose polarity can be reversed by reversing the direction of current through its winding. Current passing through the electromagnet in one direction will cause the elongated bar magnet to be attracted thus precessing the gyro in one direction while current passing through the electromagnet in the opposite direction will have the opposite effect. In order to insure that precession occurs in the desired direction when the universally suspended gimbal system is rotated, the electromagnet is energized momentarily at appropriate times during rotation by switch means thus providing a precessing torque which is applied at the appropriate angle to correct for such errors as those due to the acceleration of Coriolis and aircraft speed.

The invention will be more fully understood by referring now to the accompanying drawing showing a diagrammatic representation in perspective of a gyroscopic device embodying my invention.

Referring now to the drawing, there is shown a gyro vertical which is suitable for mounting on a moving vehicle such as an aircraft. As shown, the gyroscope comprises a rotor bearing frame 1 which houses a gyroscope rotor (not shown). The gyro bearing frame is pivoted for movement about a horizontal axis by means of trunnions 2 which are pivotally mounted in a horizontal gimbal 3. The gimbal 3 is in turn pivoted for movement about a horizontal axis perpendicular to the axis of the trunnions 2 by means of trunnions 4 which are pivotally mounted in an outer gimbal 5.

The gyro rotor is energized in a conventional manner (not shown) by connecting the rotor leads through flexible spiral connectors at the gimbal trunnions to a plurality of slip rings mounted on top of the gimbal 5. Contact may be made with these slip rings by means of external brushes.

The outer gimbal 5 is mounted on a cylindrical member 6 at the lower end of which there is secured a large gear 7 adapted to rotate the outer gimbal 5 about a vertical axis. The gear 7 may be driven by means of a pinion gear 8 so that the entire gyroscopic assembly will rotate at some slow speed, say 10 R. P. M.

The cylindrical member 6 is rotatably supported by internal radial bearings on an upright member 9 which is coaxially disposed within the cylindrical member 6 and is rigidly mounted on a stabilized platform 10. The upright member 9 supports the exciting and sensing elements of the "E" pickoffs designated generally by the numeral 11. An iron armature 12 is supported from the rotor bearing frame 1 and moves with it. Its mechanical center is in alignment with the spin axis of the gyro. The armature 12 rotates with the rotating gimbal system, and therefore, rotates with respect to the pickoffs 11. These pickoffs are so designed that the signals generated by them are zero when the electrical axis of the exciting element is aligned with the mechanical center of the armature 12. The pickoffs are further positioned so that the electrical center of the exciting element is aligned with the axis of rotation of the rotating gimbal 5. Therefore, the signal output of the "E" pickoffs is zero when the axis of rotation of the rotating gimbal is aligned with the spin axis of the gyro.

Stable platforms per se, of course, are well known, and usually comprise a horizontal supporting member which is stabilized so as to remain level at all times. Briefly, such a member may simply be a gimbal, usually the pitch gimbal and it is pivoted about the pitch axis of the vehicle. The pitch gimbal pivots are held in another gimbal usually referred to as the roll gimbal and this latter gimbal is pivoted about the roll axis of the vehicle. Both the pitch and roll gimbals are servo driven and receive their error signal from the "E" pickoffs. The system is satisfied when the "E" pickoff signals are zero. Hence, in its operating form, the axis of rotation is maintained parallel to the spin axis of the gyro, which in turn is maintained vertical by the erector.

The usual means are provided for erecting the gyroscope so that its spin axis is kept in a predetermined reference position. An acceleration responsive type of erecting system may be employed, several different varieties of which are well known to those skilled in the art. Normally, when the vehicle is at rest, the only acceleration apparent to the erector is that of gravity and the gyro will be erected to the true vertical. As previously explained, however, due to the effect of Coriolis acceleration, the erecting system becomes biased and tends to align the gyroscope to a false axis thus resulting in an error. In order to correct this error, an arrangement is provided for periodically exerting a momentary torque on the gyroscope gimbal, which is so timed, and is of such magnitude as to appropriately precess the gyroscope whereby the spin axis of the gyro is continuously corrected for the above error. The manner in which precessing torques are applied to the gyroscope gimbal to correct for this error will now be described.

Looking at the drawing, it will be seen that a permanent bar magnet 14 is adjustably supported by a clamp 15 supported from the horizontal gyro gimbal 3. The bar magnet 14 may be slidably positioned within the clamp 15 and secured by means of a bolt 17. As shown, the bar magnet 15 is centered on the gyro gimbal at a point above one of its trunnions and is rotatable in a plane normal to the axis of trunnion 4. Suspended from the rotating outer gimbal 5 and at a point directly over the bar magnet 14, is an electromagnet 18 whose axis is normal to the axis of the bar magnet when the gyro gimbal 3 is at right angles to the rotating outer gimbal 5. The bar magnet 14 and the electromagnet 18 are cooperatively disposed with respect to each other such that energization of the electromagnet 18 will cause an attracting or a repelling electromagnetic torque to be exerted on the bar magnet 14 which torque will be transferred to the gyro gimbal 3 thus causing it to tilt in one direction or the other.

Assuming for instance that the permanent magnet 14 is magnetized such that the left end is a north pole and the right end a south pole, then if a current is applied to the electromagnet 18 of a polarity such that its lower end becomes a north pole, then the south pole of the bar magnet will be attracted to it thus resulting in the application of a counterclockwise torque about the trunnions of the gyro gimbal 3. The magnitude of this torque can be varied by controlling the amount of current through the electromagnet winding. By reversing the direction of current in the electromagnet, the direction of the torque will be reversed.

As is well understood, the application of a clockwise or counterclockwise torque about the trunnion axis of the gyro gimbal 3 will cause the top of the gyro axis to precess in a plane normal to the longitudinal axis of the bar magnet 14. Therefore in order to accomplish precession in the desired direction in space it will be necessary that energization of the electromagnet take place at a point in the rotating path of the outer gimbal 5 such as will produce gyro precession in the desired plane. There are at least two points for each revolution, where the orientation of the rotating gimbal 5 is such that a torque can be applied to precess the gyro in any single desired direction. Since the above-mentioned errors occur in a predetermined azimuthal plane with respect to the position and orientation of the vehicle, it will be apparent therefore that the precessing torque may be momentarily exerted during the period when the rotating gimbal 5 is passing through the plane in which correction is desired.

In order to provide momentary energization of the electromagnet 18 in the direction desired, I have provided a means for timing the occurrence of electromagnet energization. Looking now at the drawing, it will be seen that the leads 19, 20 from the electromagnet are carried down to two partial slip rings 21, 22 mounted on the insulating member 23 which is fastened to the rotating gimbal 5. These partial slip rings 21, 22 form terminal connections for the electromagnet leads 19, 20 and serve as contacting devices which rotate with the outer gimbal 5 in an orbit about the rotating axis of the outer gimbal thus providing means for periodically contacting stationary brush elements 24, 25 which are mounted inside the receptacle, and adjustably located therein in the path traced by the slip rings 21, 22. The circumferential length of the slip rings 21, 22 may be designed to provide the optimum duration of brush contact. Slip rings extending over an arc of 10 degrees, for example, have been found very satisfactory.

Inasmuch as the entire electromagnetic arrangement rotates with the outer gimbal 5, the direction of the torque that it will act to produce, for the purpose of correcting the error due to the acceleration of Coriolis, will be correct only when the pivot axis of the gyro gimbal 3 is perpendicular to the direction of the vehicle. Since it is the purpose of the partial slip rings 21, 22 to allow the electromagnet 18 to be energized only for a small angle before and after the correct point, this means that during the short time it is energized, the electromagnet 18 must exert a torque that will precess the gyro at a much greater rate than does the acceleration of Coriolis. Thus, if P denotes the precession rate caused by Coriolis and $\omega$ is the angular speed of the rotating gimbal 5, then the error existing at the end of one revolution of the rotating gimbal 5 is $P/\omega$. If X denotes that portion of a complete revolution of the rotating gimbal 5 during which the brush elements 24, 25 contact the slip rings 21, 22, then the time during which contact is effective is $X/\omega$. The precession rate that the electromagnetic arrangement must develop will therefore be $P/\omega \div X/\omega$ or $P/X$.

Since operation in the southern hemisphere requires that the Coriolis error be corrected by providing an exactly opposite torque to that required in the northern hemisphere, this can be accomplished by means of a switch 26. Potentiometer 27 provides a means for adjusting the magnitude of the torque by varying the current in the circuit to the electromagnet in proportion to the speed and the sine of the latitude angle of the aircraft.

There may be occasion to interrupt the circuit which operates to correct for the effects of Coriolis, as for instance, when the vehicle is in a turn and the erector is disconnected. In such a case, this may be accomplished by placing switch 26 in a neutral position.

The correction for plane speed error is accomplished in similar fashion except that the electromagnet is energized 90° later when the rotating gimbal 5 is in a position at right angles to that in which the Coriolis error is corrected; or in other words, when the pivot axis of the gyro gimbal 3 is parallel to the flight path of the airplane. At this point, the slip rings 21, 22 have moved to a position of contact with brush elements 28, 29 so that the electromagnet 18 is now responsive to energization from the latter brush elements rather than from brush elements 24, 25. Since there is no need for reversing the direction of torque in this case, and the magnitude of the current to the electromagnet 18 need vary only with the speed of the airplane, the brushes 28, 29 may be connected directly to a speed responsive device 30 adapted to provide a signal which varies as a function of vehicle speed.

It will be seen therefore, that correction of both errors is readily accomplished by momentary energization of an electromagnet to produce torques of timed duration each of which precess the gyro twice in each cycle of rotation of the outer gimbal and that the direction and magnitude of the energizing current is controlled to provide exactly the desired amount of precession which will restore the spin axis of the gyro to its vertical position.

The particular embodiment shown and described is illustrative of course, and therefore, it should be understood that the appended claims are intended to encompass all such changes and modifications as fall within the true spirit and scope of my invention.

What I claim as new and desire to secure by Letters Patent of the United States is:

1. In combination, a gyroscope pivotally mounted in a gyro gimbal, an outer gimbal for pivotally supporting the gyro gimbal, a platform for supporting said outer gimbal, a bar magnet mounted on said gyro gimbal, an electromagnet suspended from the outer gimbal in cooperative electromagnetic relation with the bar magnet, terminal connections for said electromagnet mounted on the outer gimbal, driving means for rotating said outer gimbal, and contact means fixed with respect to said platform for periodically contacting said terminals whereby to energize the electromagnet and cause a torque to be exerted between said gimbals.

2. In combination, a gyroscope pivotally mounted in a gimbal having trunnions, an outer gimbal for pivotally supporting the gyro gimbals by its trunnions, a platform for supporting the outer gimbal, means for rotating said outer gimbal, a bar magnet adjustably fixed on the gyro gimbal to move therewith about the axis of said trunnions, an electromagnet suspended over the bar magnet in electromagnetic relation with the bar magnet, partial slip rings mounted on said outer gimbal and connected to said electromagnet, first brush means and second brush means fixed to said platform, each of said means being located to independently come into momentary contact with said slip rings for short periods of time whereby said electromagnet may be periodically energized.

3. In a gyroscopic device of the self-erecting type adapted to be mounted on a moving vehicle, the gyroscope being universally suspended by gimbals including a gyro gimbal and an outer gimbal, said outer gimbal being adapted for rotation about a vertical axis, the combination which comprises, a bar magnet mounted on said gyro gimbal, an electromagnet suspended from the outer gimbal in cooperative electromagnetic relation to said bar magnet, partial slip rings mounted on said outer gimbal for terminating connections from said electromagnet, first brush means and second brush means fixed on said support to independently come into momentary contact with said slip rings, said first brush means being positioned so that contact with said slip rings will cause gyro precession in a direction at right angles to the direction of movement of said vehicle, and said second brush means being positioned so that contact with said slip rings will cause gyro precession in the direction of movement of said vehicle.

4. The combination defined in claim 3 further comprising speed responsive means connected to one of said brush means and adapted to apply thereto a signal which varies as a function of vehicle speed.

5. The combination defined in claim 3 further comprising means for reversing the polarity of said electromagnet.

DUANE F. ANDERSON.

REFERENCES CITED

The following references are of record in the file of this patent:

UNITED STATES PATENTS

| Number | Name | Date |
|---|---|---|
| 2,274,443 | Fischer | Feb. 24, 1942 |
| 2,417,081 | Lynn | Mar. 11, 1947 |
| 2,419,063 | Fischer | Apr. 15, 1947 |
| 2,494,429 | Caris et al. | Jan. 10, 1950 |

FOREIGN PATENTS

| Number | Country | Date |
|---|---|---|
| 615,734 | Great Britain | Jan. 11, 1949 |